July 23, 1929.  L. A. CORNELIUS  1,721,945
SPRAY NOZZLE
Filed Nov. 23, 1925
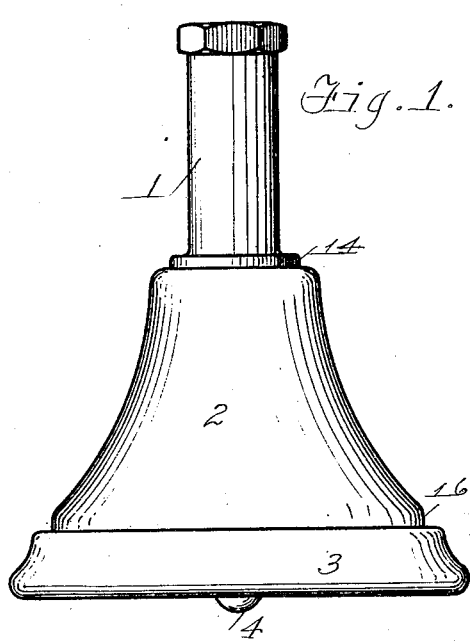
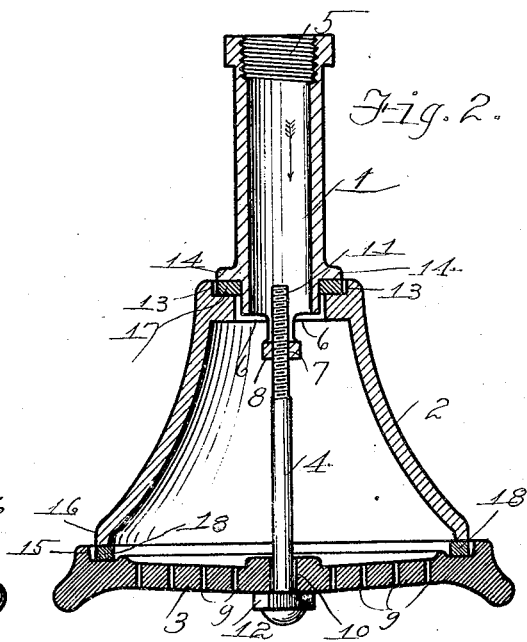
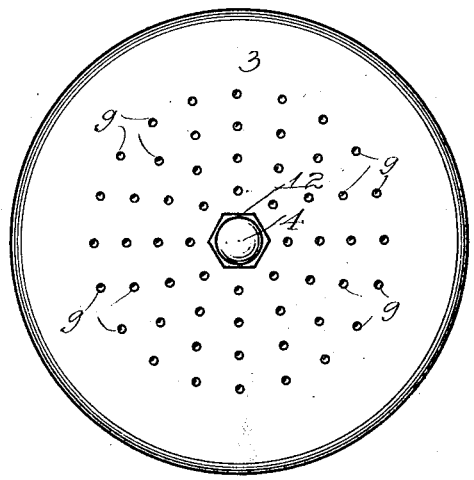
INVENTOR.
Louis A. Cornelius
BY Cyrus W. Rice
ATTORNEY.
Witness:
J. Hagestein Patented July 23, 1929.

1,721,945

UNITED STATES PATENT OFFICE.

LOUIS A. CORNELIUS, OF GRAND RAPIDS, MICHIGAN, ASSIGNOR TO WOLVERINE BRASS WORKS, OF GRAND RAPIDS, MICHIGAN, A CORPORATION OF MICHIGAN.

SPRAY NOZZLE.

Application filed November 23, 1925. Serial No. 70,912.

The present invention relates to spray nozzles, such as are employed in shower-bath apparatus and the like; and its object is to provide such a device comprising separate parts which may be readily assembled or connected tightly for use and as readily disassembled and separated for cleaning purposes.

This and any other objects hereinafter appearing are attained by, and the invention finds preferable embodiment in, the device hereinafter particularly described in the body of this specification and illustrated by the accompanying drawings, in which:—

Figure 1 is a side view of a spray nozzle;

Figure 2 is an axial sectional view thereof; and

Figure 3 is an outer end view of the same.

The device illustrated by the drawings comprises a tubular inner or first member 1, a hollow intermediate or second member 2 and a perforated outer or third member 3, all said members being detachably held together tightly to prevent leakage between them by a single screw bolt 4. The inner member 1 is adapted to be secured, as by its screw threads 5, to a water supplying pipe not shown, and has adjacent its outer end or discharge vent 6 a threaded socket 7 formed in a cross bar 8. The hollow intermediate member 2 is bell shaped, expanding toward its outer end. The outer member 3 is shown disk shaped, is perforated at 9 for the passage of water in a spray therethrough, and has a centrally disposed opening 10 therethrough. The screw bolt 4 is adapted to be inserted into said opening, passed through the hollow intermediate member 2, and its threads 11 turned in the socket 7, its head 12 engaging the outer side of the outer member 3. When this bolt is screwed down, the three members are held together in their illustrated interrelative positions so tightly as to prevent leakage between them. To properly thus position and hold the parts against lateral displacement and to thus prevent such leakage, the intermediate member 2 is provided at its inner or smaller end with an annular recess 13 adapted to receive the outer end or flange 14 of the inner member 1, and the outer member 3 is similarly provided on its inner side with a like recess 15 adapted to receive the outer or larger end 16 of the intermediate member 2. Packing rings 17, 18 are placed in these recesses respectively and are compressed when the screw bolt 4 is tightly turned down.

It will be seen that the said three members of this device are tightly held together by a single screw bolt, and may nevertheless be readily disassembled and separated for cleaning.

The invention being intended to be pointed out in the claims, is not to be limited to or by details of construction of the particular embodiment thereof illustrated by the drawings or hereinbefore described.

I claim:

In a spray nozzle: a tubular inner member having adjacent its outer end and spaced inwardly therefrom an external radial flange and having adjacent said outer end an axially central threaded socket; a hollow intermediate member expanding toward its outer end and having adjacent its inner end an internal radial flange surrounding said inner member outwardly from said external flange thereof, said internal flange removably abutting at its inner side surface on the outer side surface of said external flange; a perforated outer member having a bolt-receiving opening therethrough; a headed screw bolt adapted to be inserted into said opening, passed through the hollow intermediate member and threaded in said socket.

In testimony whereof I have hereunto set my hand at Grand Rapids, Michigan, this 13th day of November, 1925.

LOUIS A. CORNELIUS.